United States Patent
Ullmer et al.

(10) Patent No.: US 10,000,341 B2
(45) Date of Patent: Jun. 19, 2018

(54) CONVEYOR SYSTEM AND METHOD

(71) Applicant: PEMCO INC., Sheboygan, WI (US)

(72) Inventors: Thomas Ullmer, Sheboygan, WI (US); Terry Lee Eernissee, Cedar Grove, WI (US); Eric Edward Walker, Campbellsport, WI (US)

(73) Assignee: PEMCO INC., Sheboygan, WA (US)

( * ) Notice: Subject to any disclaimer, the term of this patent is extended or adjusted under 35 U.S.C. 154(b) by 0 days. days.

(21) Appl. No.: 15/095,931

(22) Filed: Apr. 11, 2016

(65) Prior Publication Data

US 2016/0221759 A1      Aug. 4, 2016

Related U.S. Application Data

(62) Division of application No. 14/255,679, filed on Apr. 17, 2014, now Pat. No. 9,346,627.

(60) Provisional application No. 61/814,676, filed on Apr. 22, 2013.

(51) Int. Cl.
| | |
|---|---|
| *B65G 21/14* | (2006.01) |
| *B65G 43/08* | (2006.01) |
| *B65G 37/00* | (2006.01) |
| *B65G 43/10* | (2006.01) |
| *B65G 47/52* | (2006.01) |
| *B65G 15/24* | (2006.01) |
| *B65G 47/31* | (2006.01) |

(52) U.S. Cl.
CPC ............. *B65G 21/14* (2013.01); *B65G 15/24* (2013.01); *B65G 37/00* (2013.01); *B65G 43/08* (2013.01); *B65G 43/10* (2013.01); *B65G 47/31* (2013.01); *B65G 47/52* (2013.01); *B65G 2811/0673* (2013.01)

(58) Field of Classification Search
None
See application file for complete search history.

(56) References Cited

U.S. PATENT DOCUMENTS

| | | |
|---|---|---|
| 3,075,630 A | 1/1963 | Fisk |
| 4,790,224 A | 12/1988 | Krutilla et al. |

(Continued)

*Primary Examiner* — Kavel Singh
(74) *Attorney, Agent, or Firm* — Marshall, Gerstein & Borun LLP

(57) ABSTRACT

A conveyor system comprising a synchronization unit having a first conveyor belt, a second conveyor belt disposed adjacent to the first conveyor belt, an inlet end and an outlet end. The system further comprises a joint shuttle disposed between the first conveyor belt and the second conveyor belt, each of the first and second conveyor belts having a variable length while the distance between the inlet end and the outlet end is fixed. A discharge conveyor belt is disposed upstream the inlet end and is operating at a first velocity ($V_D$). At a time T1, the velocity of the first conveyor belt ($V_1T_1$) is equal to the velocity of the discharge conveyor belt ($V_D$) and, at a time T2, the velocity of the first conveyor belt ($V_1T_2$) is equal to the velocity of the second conveyor belt ($V_m$), without relative movement between the conveyor belts and objects conveyed thereon.

7 Claims, 12 Drawing Sheets

(56) References Cited

U.S. PATENT DOCUMENTS

| | | | | |
|---|---|---|---|---|
| 4,962,844 A | * | 10/1990 | Francioni | B65G 47/31 |
| | | | | 198/460.3 |
| 5,082,103 A | * | 1/1992 | Ross | B65G 47/31 |
| | | | | 198/460.1 |
| 5,634,551 A | * | 6/1997 | Francioni | B65B 35/44 |
| | | | | 198/460.1 |
| 9,107,424 B2 | | 8/2015 | Miller | |

* cited by examiner

CONVEYOR SYSTEM AND METHOD

CROSS REFERENCE TO RELATED APPLICATION

This application is a divisional of U.S. application Ser. No. 14/255,679, filed Apr. 17, 2014 which claims the benefit of the filing date of U.S. Provisional Application No. 61/814,676 filed Apr. 22, 2013. The entire disclosure of U.S. Provisional Application No. 61/814,676 is incorporated herein by reference.

FIELD OF THE DISCLOSURE

This disclosure relates generally to a conveyor system and method, and, more specifically, to a conveyor system and method for synchronizing at least one of the velocity and relative orientation of conveyed objects.

BACKGROUND OF THE DISCLOSURE

In general, there are various types of conveyor systems used to displace sensitive products from one position to another. Conveyor systems are frequently employed to transfer products between stations having one or more machines that perform operations on the products to convert the products from one form to another form. Many conveyor systems will typically also then transport finished products to downstream equipment for packaging, for example. In one example, a conveyor is used with a flexible sheeter that is capable of converting coated papers or other similar products from roll form to stacked cut sheets of paper. More specifically, a portion of the sheeter is referred to as a discharge conveyor belt that receives stacked sheets of product, for example, for wrapping and further packaging downstream of the discharge conveyor.

In many cases, the downstream equipment requires the stacks of product to be delivered in a consistent manner. This is usually at a predefined pitch and velocity to allow the downstream equipment to "phase" to the incoming product. More specifically, and for example, the sheeter delivers product off of the discharge conveyor in a pulse form, which may include 1 or multiple stacks back-to-back with a gap following the grouping or "pulse" of plurality of stacks until the next pulse of product is delivered. Because phasing of downstream equipment is easier when there is a consistent pitch (distance) and velocity of incoming products, there is a need to combine the aforementioned pulsed discharges and form a continuous stream that can be uniformly gapped with a speed-up conveyor placed between the sheeter and the downstream equipment.

One method of combining the pulsed discharges of products is to have a second simple conveyor between the gapping conveyor and the sheeter's discharge conveyor belt. This second conveyor receives a pulse "n" and then slows down to allow pulse "n+1" to "catch up." Due to different velocities of the gapping conveyor, the second simple conveyor, and the sheeter's discharge conveyor, this process results in relative movement or "skidding" between the product and the conveyor that serves to eliminate the gaps between the pulses. This "skidding" can mar several of the bottom sheets of each stack of the product and, even if the impurities imparted to the sheets due to skidding are subtle, they can lead to undesirable bleeding of deposited ink during inkjet printing operations, rendering printed pages unsuitable for use. As such, skidding can result in latent defects in reams of paper, which defects only come to light once costly printing operations are performed by an end user. Processing operations that avoid relative movement between conveyor belts and stacks of sheets being transported thereon would be advantageous.

SUMMARY OF THE DISCLOSURE

The present disclosure is directed to a conveyor system for synchronizing at least one of the velocity and relative orientation of conveyed objects and a method of controlling the same. More specifically, in one example of the present disclosure the conveyor system comprises a synchronization unit having a first conveyor belt, a second conveyor belt disposed adjacent to the first conveyor belt, an inlet end and an outlet end. A joint shuttle is disposed between the first conveyor belt and the second conveyor belt, each of the first and second conveyor belts having a variable length while the distance between the inlet end and the outlet end is fixed. A discharge conveyor belt is disposed upstream of the inlet end, the discharge conveyor belt operating at a first velocity ($V_D$).

At a time T1, the velocity of the first conveyor belt ($V_eT_1$) is equal to the velocity of the discharge conveyor belt ($V_D$), and at a time T2, the velocity of the first conveyor belt ($V_eT_2$) is equal to the velocity of the second conveyor belt ($V_m$) (which itself may be a metering belt that controls the rate at which conveyed objects are delivered to downstream processing equipment), the velocity of the second conveyor belt ($V_m$) being different from the velocity of the discharge conveyor belt ($V_D$). This control of the operation of the conveyor system permits transfers of product from one belt to the next to occur without relative movement between the conveyor belts and objects conveyed thereon, along the entire transfer from the inlet end, in a first relative orientation pattern of the objects, to the outlet end, in a second relative orientation pattern of the objects.

DETAILED DESCRIPTION OF THE PREFERRED EMBODIMENTS

Figure 1:
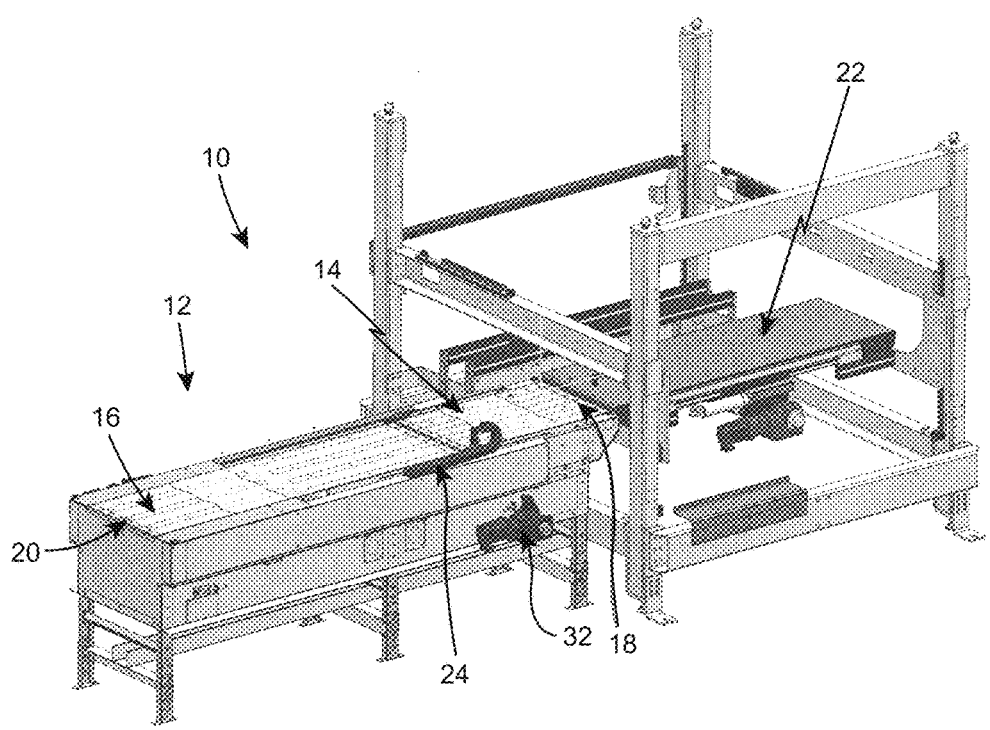
FIG. 1 is a perspective view of a conveyor system according to one aspect of the present disclosure.

Referring now to FIG. 1, a conveyor system 10 for synchronizing at least one of the velocity and relative orientation of conveyed objects is depicted. The conveyor system 10 includes a synchronization unit 12 having a first conveyor belt 14 and a second conveyor belt 16 disposed adjacent to the first conveyor belt 14. The synchronization unit 12 further includes an inlet end 18 disposed at one end of the synchronization unit 12 and an outlet end 20 disposed at the other end of the synchronization unit 12. In one example, the first conveyor belt 14 is a synchronization conveyor belt and the second conveyor belt 16 is a metering conveyor belt, as explained and referred to in more detail below.

The conveyor system 10 further includes a discharge conveyor belt 22 that is disposed upstream of the inlet end 18 of the synchronization unit 12. In one example, the discharge conveyor belt 22 is part of a sheeter (not shown) that converts coated paper from roll form to stacks of cut sheets. The discharge conveyor belt 22 may receive stacked sheets of paper, for example, and transport them out of the sheeter to downstream packaging equipment. In addition, the discharge conveyor belt 22 often operates in conjunction with a gripper (not shown). During a gripper cycle, the gripper places logs onto the discharge conveyor belt 22. Each log may include 1 or multiple stacks (or reams) of paper, for example. During placement of the logs onto the discharge conveyor belt 22, the discharge conveyor belt 22 is stationary, as explained in more detail below. Once a gripper cycle is complete, e.g., the when the gripper fully releases a log onto the discharge conveyor belt 22, the discharge conveyor belt 22 is actuated from a stationary position to move the reams of paper to the first or synchronization conveyor belt 14.

While logs are referred to as being conveyed through the conveyor system 10 of the present disclosure in the above example, one of skill in the art will appreciate that various items or objects other than logs of paper may alternatively be conveyed through the conveyor system 10 and systems for conveying any types of objects fall within the scope of the present disclosure.

Figure 2:
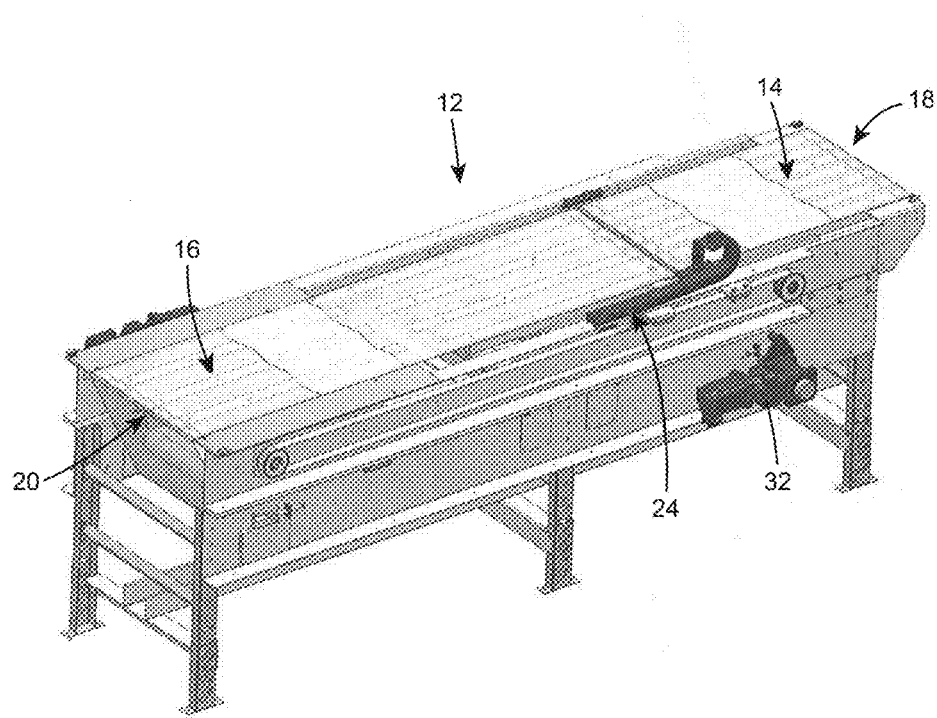
FIG. 2 is a perspective view of a synchronization unit of the conveyor system of FIG. 1.

Referring now to FIG. 2, the conveyor system 10 also includes a joint shuttle 24 that is disposed between the first conveyor belt 14 and the second conveyor belt 16 of the synchronization unit 12. In general, the joint shuttle 24 enables the lengths of the synchronization belt 14 and the metering belt 16 to vary while the distance between the inlet end 18 and the outlet end 20 of the synchronization unit 12 is fixed, as explained in more detail below. Such orientation helps prevent relative movement between the synchronization and metering belts 14, 16 and objects being conveyed, advantageously avoiding skidding and marking or otherwise marring the objects, for example.

In addition, the system 10 may further include a plurality of objects (FIG. 11), such as logs, to be conveyed into the inlet end 18 of the synchronization unit 12 in a first relative orientation pattern. The plurality of objects are then further conveyed along the length of the synchronization unit 12 by the synchronization unit 12 and the joint shuttle 24 and discharged out of the outlet end 20 in a second relative orientation pattern. During the movement from the inlet end 18 to the outlet end 20 of the synchronization unit 12, there is no relative movement between the first and second conveyor belts 14, 116, e.g., the synchronization and metering belts, and consecutive objects of the plurality of objects being conveyed. This also allows the conveyor system 10 to discharge the objects out of the outlet end 20 of the synchronization system without skidding or imparting markings to the objects, a result extremely important when processing objects comprising coated paper grades.

A first relative orientation pattern of the plurality of conveyed objects ((n), (n+1), . . . ) includes a pulse form including a gap between each object (n) of the plurality of objects (i.e., (n)-gap-(n-1)-gap-(n+2)-gap-(n+3)-gap- . . . ), each pulse or each log. A second relative orientation pattern may include a continuous back-to-back stream without a gap between each object of the plurality of objects (i.e., (n), (n+1), (n+2), (n+3), . . . ), each pulse or each log. Alternatively, the second relative orientation pattern may include a fixed, determinable, and consistent gap between successive pulses, logs or pluralities of objects. In one example, the second relative orientation pattern may include a gap between one or more of the plurality of objects of a different length than gaps between objects of the first relative orientation pattern (e.g., (n)-$gap_1$-(n+1)-$gap_1$-(n+2)-$gap_1$-(n+3)-$gap_1$- . . . , where $gap_1$ is of a different length than the length of the gap of the first relative orientation pattern). More specifically, and in one example, an operator may define the gap in the second relative orientation pattern as an integer multiple of one of the stacks of paper. One of skill in the art will further appreciate that the first and second relative orientation patterns are not limited to the foregoing examples only; rather, either or both of the first and second relative orientation patterns may include several variations of gaps between products. In addition, the second relative orientation pattern may also include continuous back-to-back streams, or modified back-to-back streams without a gap between each object of the plurality of objects and still fall within the scope of the present disclosure.

Figure 3:
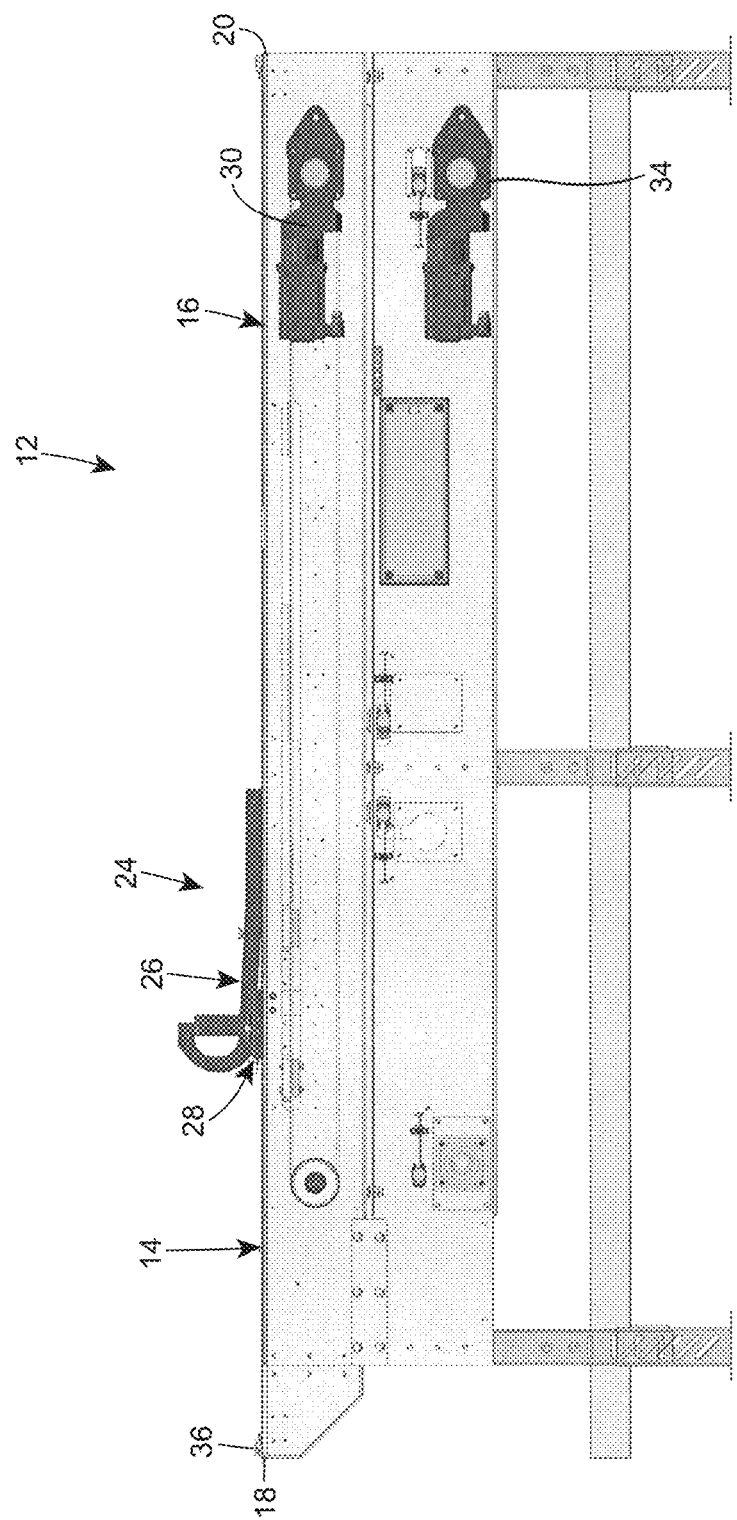
FIG. 3 is rear view of the synchronization unit of the conveyor system of the present disclosure.

Referring now to FIG. 3, the conveyor system 10 further includes a joint shuttle servomotor 30, a first conveyor or synchronization belt servomotor 32 (FIGS. 1 and 2) and a second or metering belt servomotor 34, each of which interact to control the synchronization unit 12, as explained in greater detail below. Generally, the joint shuttle servomotor 30 drives the joint shuttle 24 to match a trailing edge of an exiting object "n" with a leading edge of an "n+1" approaching object of the plurality of objects.

Still referring to FIG. 3, the joint shuttle 24 further includes a joint 26 disposed between the first and second conveyors 14, 16 and a registration eye 28 disposed a fixed distance from the joint 26. More specifically, in one example, the registration eye 28 is disposed 100 mm upstream from the joint 26. Generally, a registration routine is enacted on the registration eye 28 before objects from the plurality of objects are merged to help ensure the objects are discharged without skidding. In one example, the routine involves calculating both a synchronization belt error SE and a joint shuttle error JSE via the registration eye 28. The velocity $V_e$ of the synchronization belt and the velocity $V_{JS}$ of joint shuttle are then simultaneously adjusted during operation of the conveyor system 10 to accommodate such errors and help ensure objects are merged gently.

More specifically, the registration routine involves first capturing a velocity $V_e$ of the first or synchronization belt 14, a position $P_e$ of the synchronization conveyor belt 14, and a position $P_m$ of the second or metering conveyor belt 16 when the approaching log "n+1" blocks the registration eye 28. These values are used to determine the synchronization belt error SE that is applied as a superimposed position move over a current velocity command of the first or synchronization conveyor belt 14, as explained in more detail below.

Specifically, the synchronization error SE is calculated using the following equation:

SE=STR–D1, where

D1=KP–Pe,

KP=destination position of the synchronization conveyor belt,

Pe=position of the synchronization conveyor belt,

STR=synchronization travel remaining=½*(t1)*($V_e$+$V_m$), t1=time until a "kiss" position, $V_m$=metering conveyor belt velocity, and $V_e$=synchronization conveyor belt velocity.

The velocity $V_m$ of the second or metering conveyor belt is a constant velocity equal to a length of an object or log of paper that makes up one discharge "LL" divided by the gripper cycle time GCT described above. Said another way, the velocity of the second or metering conveyor belt 16 is a constant velocity $V_m$=LL/GCT during the conveying process.

A time t1 until a "kiss" position, or the position at which the leading end of the approaching object "n+1" matches a trailing end of the exiting object "n," is known, as is a destination position KP of the synchronization conveyor belt 14, as it is a fixed value for a given object or log length, for example.

In addition to the synchronization error SE, the joint shuttle error JSE is calculated using the following equation:

JSE=JTR–D2, where:

D2=KP–Pm,

KP=destination position of the synchronization conveyor belt,

Pm=position of the metering conveyor belt,

JTR=joint shuttle travel remaining=(t1)*($V_m$), t1=time until a "kiss" position, and $V_m$=metering conveyor belt velocity.

Like the calculated amount of the synchronization error SE, the calculated amount of the joint shuttle error JSE is simultaneously applied as a superimposed position move over the current velocity command for the joint shuttle 24. Such superimposed position moves help the objects merge gently while being conveyed.

Still referring to FIG. 3, the conveyor system 10 further comprises a joint eye 36 disposed on the inlet end 18 of the synchronization unit 12 between the discharge conveyor belt 22 and the synchronization conveyor belt 14. The joint eye 36, which may, for example, be in the form of a light beam and an optical detector that selectively identifies the presence of an object upon that object's blocking of the light beam, captures an actual object length by viewing the leading and trailing edge of an object in the plurality of objects being conveyed. This actual length value is compared to a theoretical object length. If there is a difference between the actual length and the theoretical length, the difference is used to reset a position value of the discharge conveyor belt 22 and the synchronization conveyor belt 14.

Figure 4:
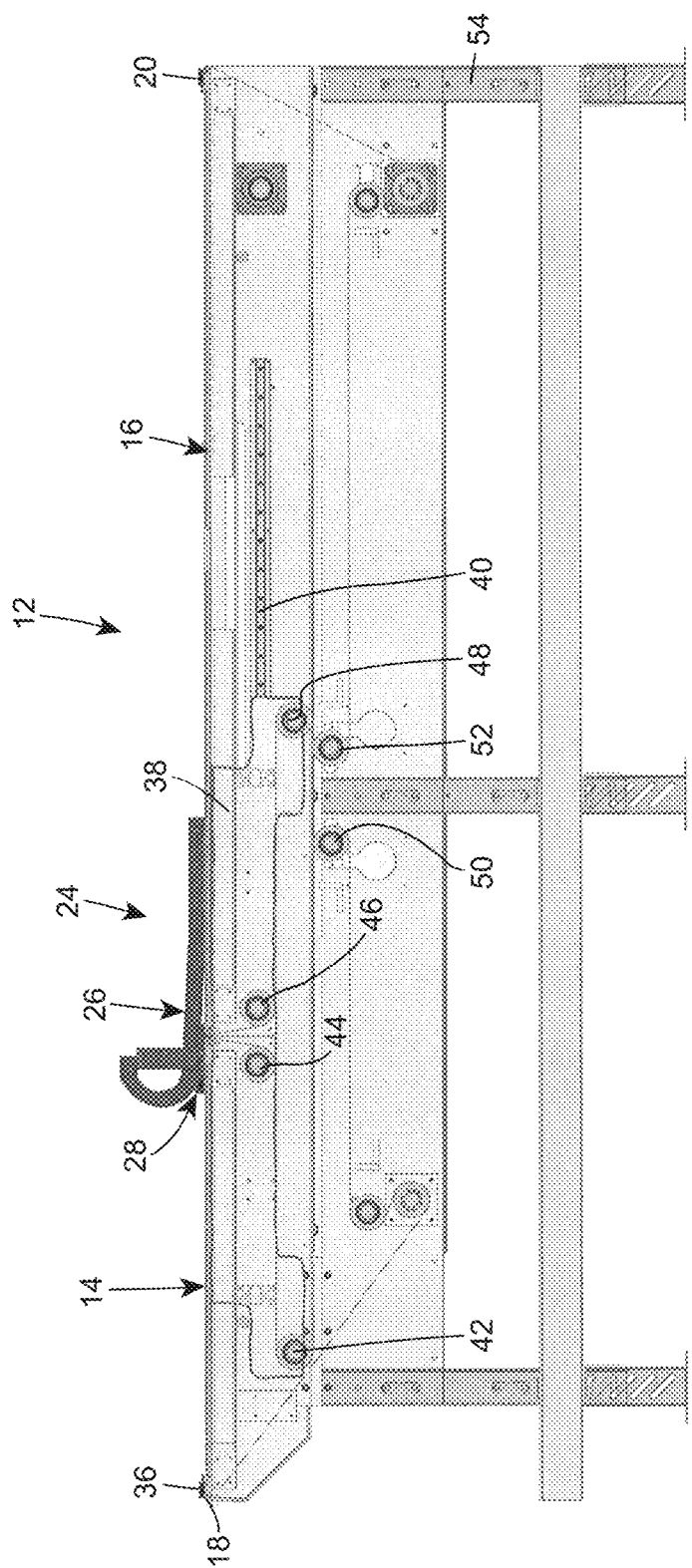
FIG. 4 is a rear cross-sectional view of the synchronization unit of the conveyor system of the present disclosure.

Referring now to FIG. 4, a cross-sectional view of the synchronization unit 12 is depicted, illustrating various internal components of the unit 12. For example, the joint shuttle 24 further includes a joint shuttle carriage 38 that moves along a joint shuttle guide rail 40 during operation. The joint shuttle carriage 38 includes two idlers 42, 44 from the synchronization conveyor belt 14 and two idlers 46, 48 from the metering belt conveyor 16, all of which move laterally with the joint shuttle 24 along the length of the joint shuttle guide rail 40 to adjust the lengths of each of the synchronization conveyor belt 14 and the metering conveyor belt 16, for example. Idlers 50 and 52 are stationary with a lower frame assembly 54 of the conveyor system 10. There are also two small diameter rollers (not shown) disposed beneath the joint 26 of the joint shuttle 24 that move with the joint shuttle 24. The two small diameter rollers may be referred to as a "knife edge" roller. The "knife edge" roller or very small diameter roller sets minimize the gap created from larger diameter rollers or idlers 44, 46, for example.

Likewise, there is another "knife edge" roller set disposed at each of the inlet end 18 and the outlet end 20 of the synchronization unit 12 for the same purpose. However, the "knife edge" rollers disposed on the inlet and outlet ends 18, 20 are in fixed positions to also help maintain the overall fixed length of the synchronization unit 12.

Figure 5:
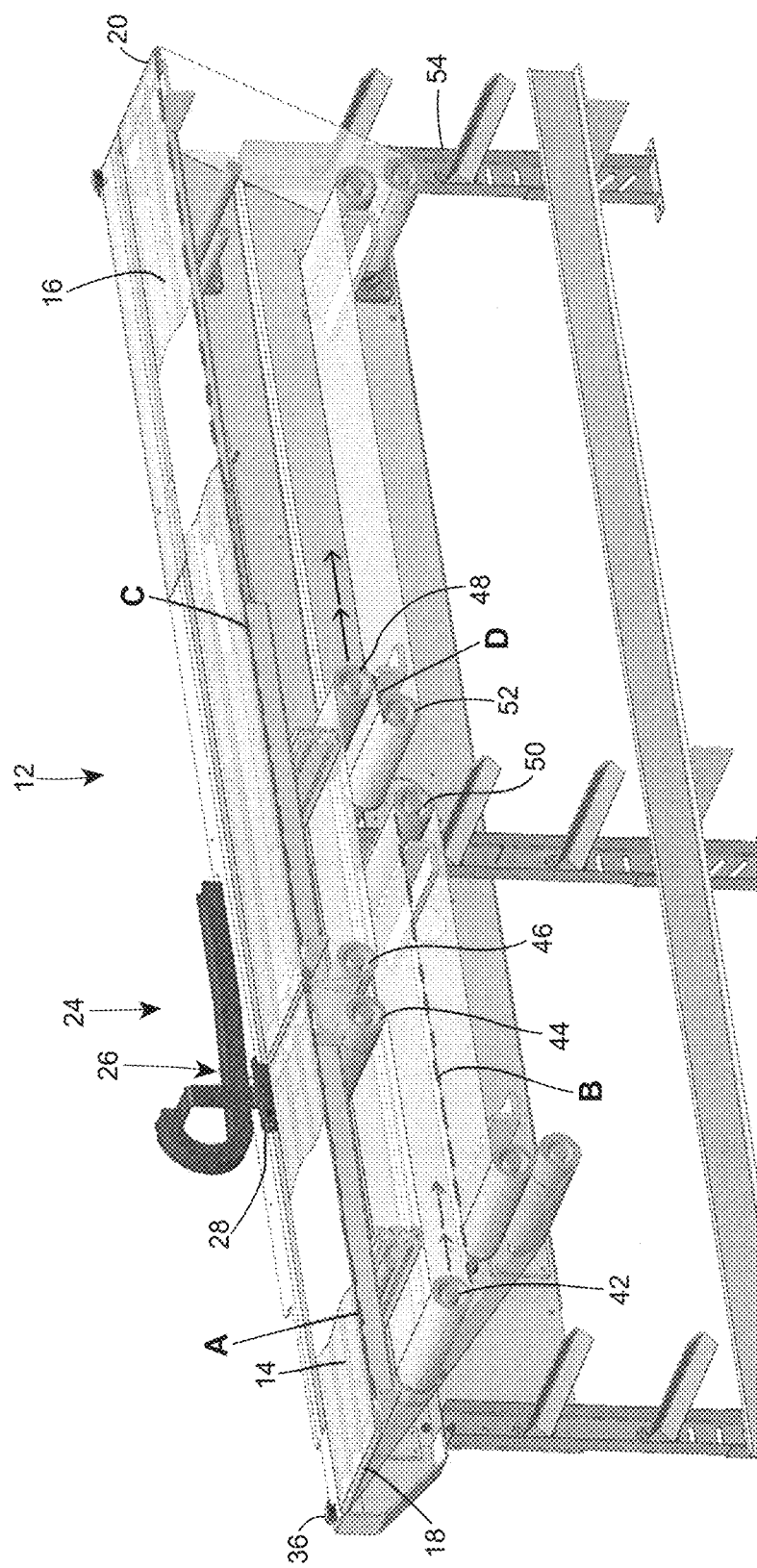
FIG. 5 is a rear perspective view of the synchronization unit of the conveyor system of the present disclosure.

Referring now to FIG. 5, a perspective view of the synchronization unit 12 is depicted, illustrating movement of the joint shuttle 24 in a lateral direction toward the outlet end 20. In particular, as the joint shuttle 24 moves laterally in the downstream direction, a section A of the synchronization conveyor belt 14 increases in length and section B of the synchronization conveyor belt 14 disposed below section A decreases in length the same amount section A increases in length. In addition, idler 42 of the joint shuttle carriage 38 (FIG. 4) moves with the joint shuttle 24, decreasing the distance between idler 42 and stationary idler 50, which is not a part of the joint shuttle carriage 38.

The same relationship is true of the metering belt conveyor 16. More specifically, as the joint shuttle 24 moves laterally in the downstream direction, a section C of the metering conveyor belt 16 decreases in length and a section D of the metering conveyor belt 16 disposed below section C increases in length by the same amount the section C decreases in length. In addition, the idler 48 moves with the joint shuttle 24, increasing the distance between the idler 48 and stationary idler 52.

Said another way, as the synchronization conveyor belt 14 increases in length, the metering conveyor belt 16 decreases in length the same amount the synchronization conveyor belt 14 increases in length, maintaining a fixed distance or length between the inlet end 18 and the outlet end 20 of the synchronization unit 12.

In a similar manner, as the joint shuttle 24 moves laterally in an upstream direction toward the inlet end 18, the first or synchronization conveyor belt 16 decreases in length and the second or metering conveyor belt 16 increases in length the same amount the synchronization conveyor belt 14 decreases in length, maintaining the fixed distance between the inlet end 18 and the outlet end 20 of the synchronization unit.

In one example, the synchronization conveyor belt 14 has a variable length in the range of 1 meter to 2 meters, the second or metering conveyor belt 16 has a variable length in the range of 1 meter to 2 meters, and a sum of the lengths of the first and second, e.g., synchronization and metering conveyor belts 14, 16, respectively, is equal to about 3 meters. Of course, one of skill in the art will appreciate that such values are exemplary only and that many other various adjustable lengths of both the conveyor belts 14, 16 and, thus, the sum of the lengths of the first and second conveyor belts may be utilized without departing from the scope of the present disclosure.

Figure 6:
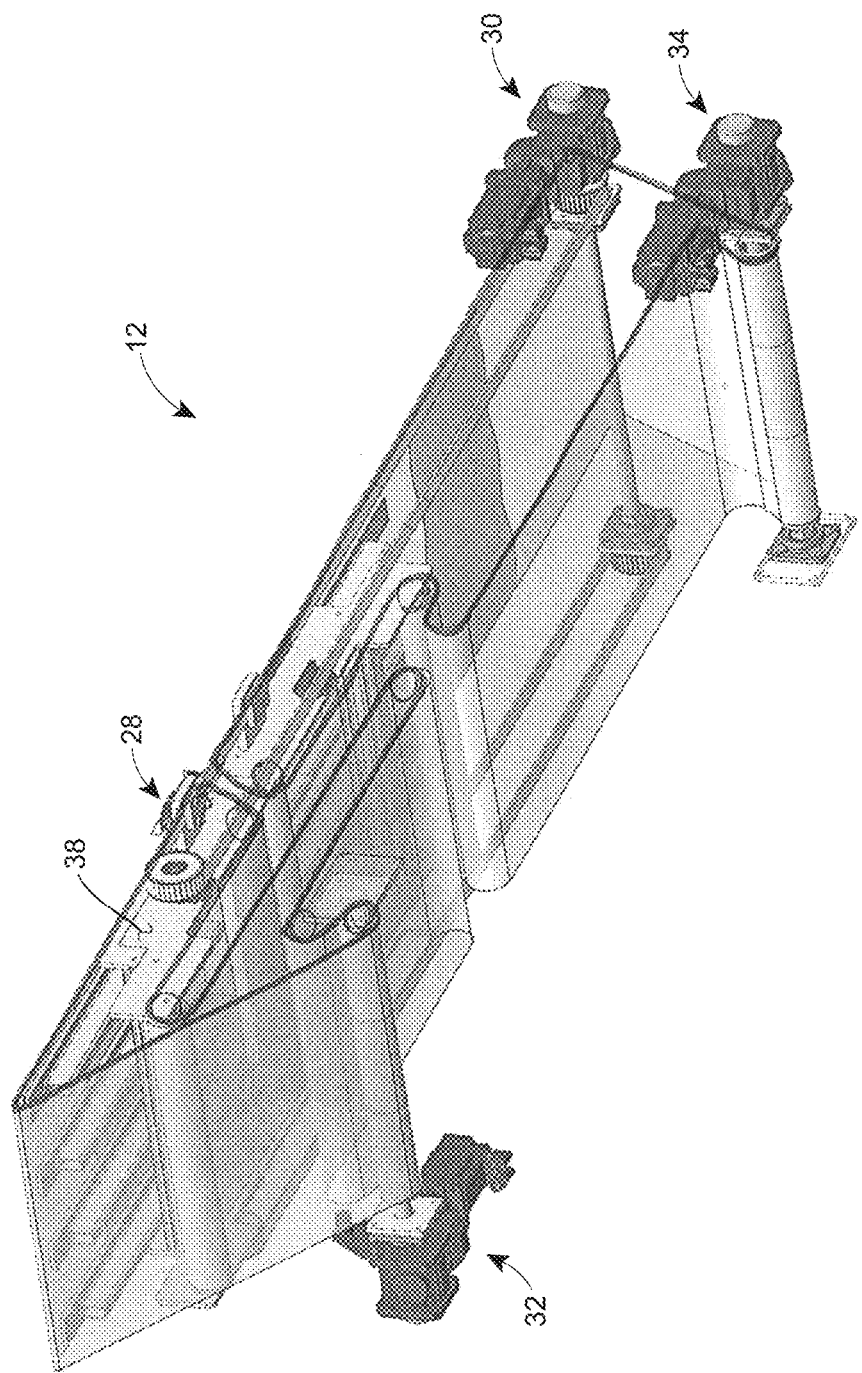
FIG. 6 is a bottom rear perspective view of a portion of the synchronization unit of the conveyor system of the present disclosure.
Figure 7:
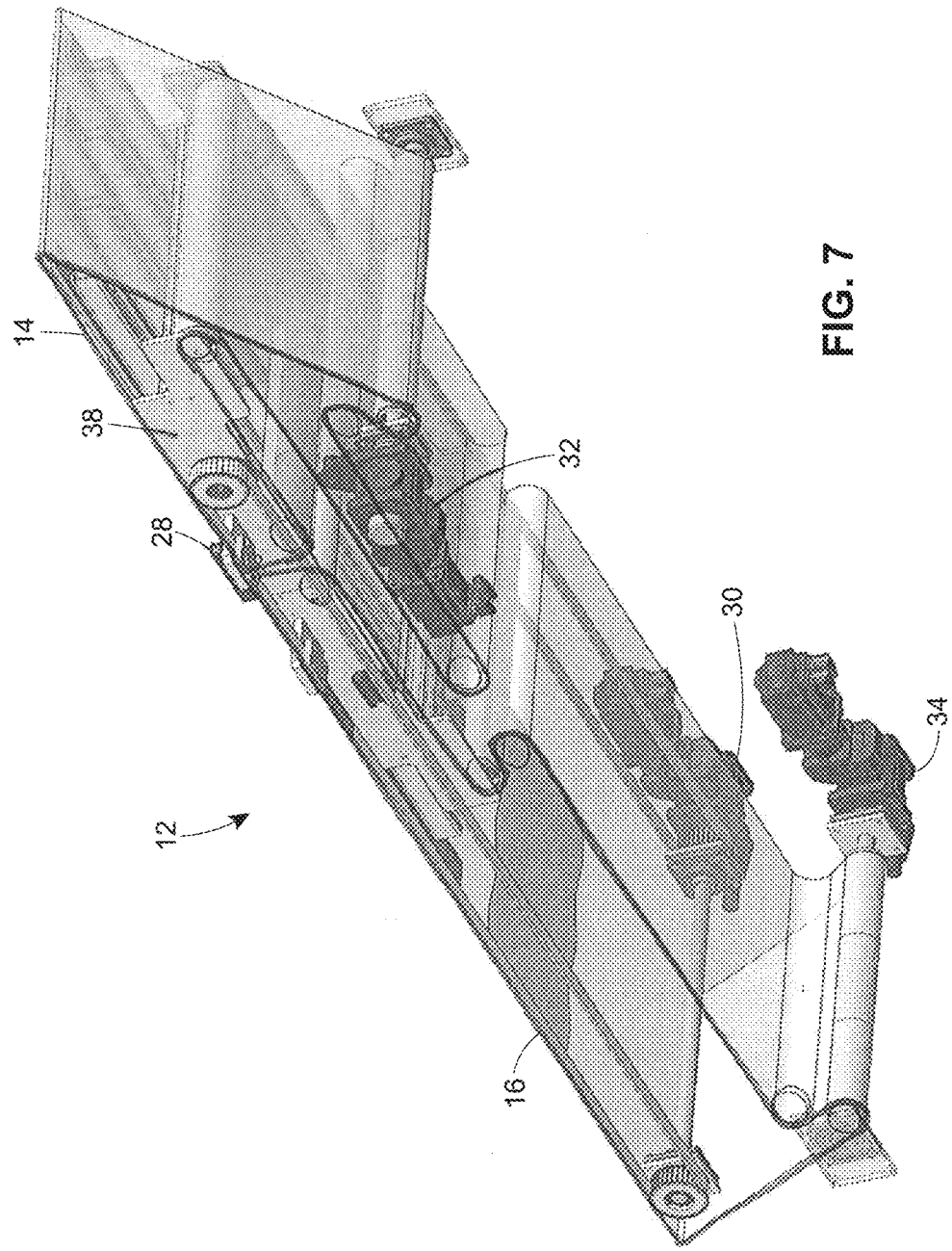
FIG. 7 is a bottom front perspective view of a portion of the synchronization unit of the conveyor system of the present disclosure.
Figure 8:
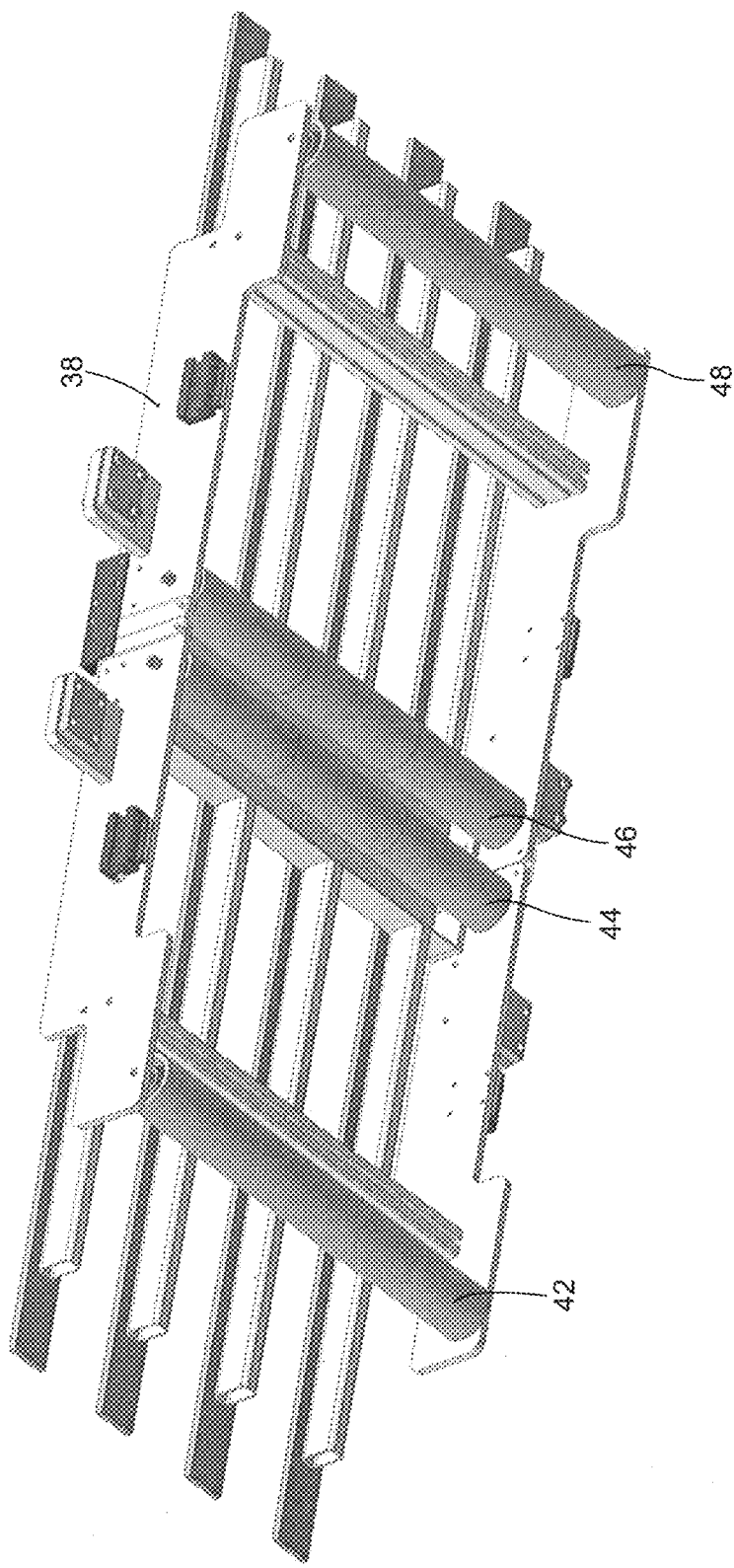
FIG. 8 is a bottom view of a portion of a joint shuttle of the synchronization unit of the conveyor system of the present disclosure.

Referring now to FIGS. 6-8, additional views of the synchronization unit 12 of the conveyor system 10 are depicted. FIGS. 6 and 7 illustrate rear and front views, respectively, of the synchronization servomotor 32, the joint shuttle servomotor 30 and the metering belt servomotor 32. The joint shuttle carriage 38 is further depicted. FIG. 8 is an internal, bottom perspective view of a portion of the joint shuttle carriage 38, illustrating further detail of each of the idlers 42, 44 of the synchronization conveyor belt 14 and each of the idlers 46, 48 of the metering conveyor belt 16.

Figure 9:
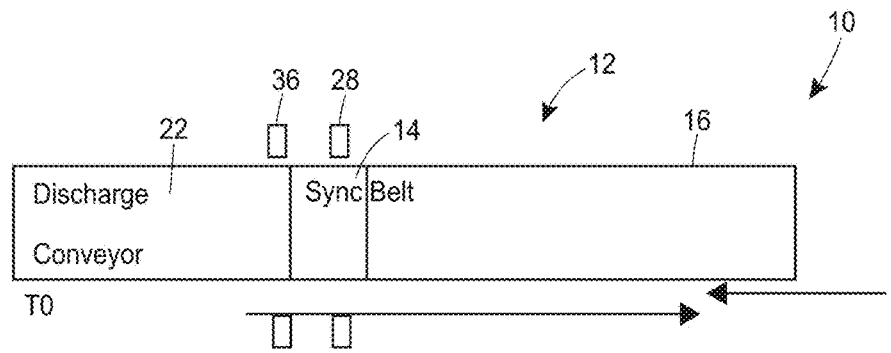
FIG. 9 is a schematic view illustrating a discharge conveyor belt interacting with the synchronization unit of the conveyor system of the present disclosure.

Referring now to FIGS. 9-12, various diagrams of the conveyor system 10 are depicted. FIG. 9 depicts the conveyor system 10 at a time T0, in which the system 10 is ready to receive an object of the plurality of objects on the discharge conveyor belt 22. At this point, the discharge conveyor belt 22 is stationary, waiting to receive an object or log upstream, for example.

Figure 10:
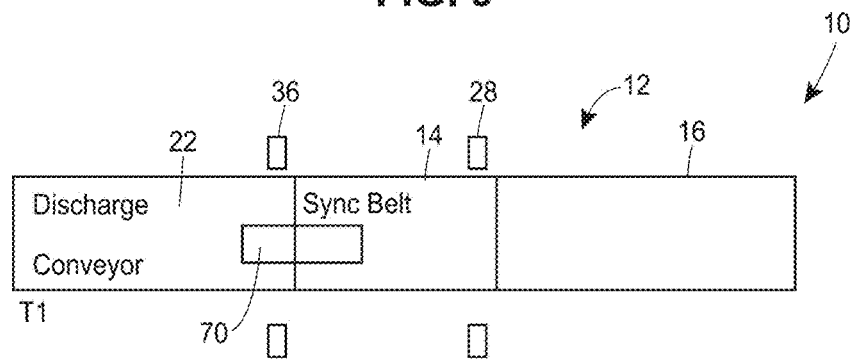
FIG. 10 is another schematic view of the conveyor system of FIG. 9 at a time T1.

FIG. 10 depicts a time T1, in which an object 70 of the plurality of objects has been received by the discharge conveyor belt 22, and discharge conveyor belt 22 has been actuated by a discharge belt servomotor 72 (FIG. 1) to operate at a set velocity $V_D$. At this time T1, the velocity $V_eT_1$ of the first conveyor belt 14 or synchronization conveyor belt 14 is equal to the velocity $V_D$ of the discharge conveyor belt.

Figure 11:
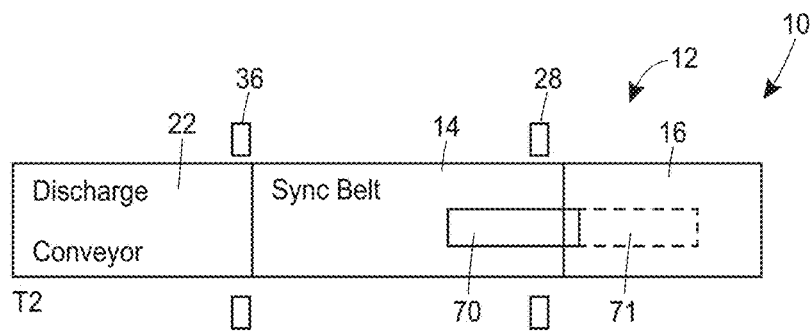
FIG. 11 is yet another schematic view of the conveyor system of FIG. 9 at a time T2.

In FIG. 11, a time T2 is depicted, in which the object 70 of the plurality of objects being conveyed has been fully discharged from the discharge conveyor belt 22 and is disposed on the synchronization conveyor belt 14 of the synchronization unit 12. In addition, the leading edge of the approaching object 70 matches the trailing edge of the exiting object 71. In other words, the "kiss" or merge position is reached. At this time T2, the velocity $V_eT_2$ of the first or synchronization conveyor belt 14 is equal to the velocity $V_m$ of the second or metering conveyor belt 16.

Figure 12:
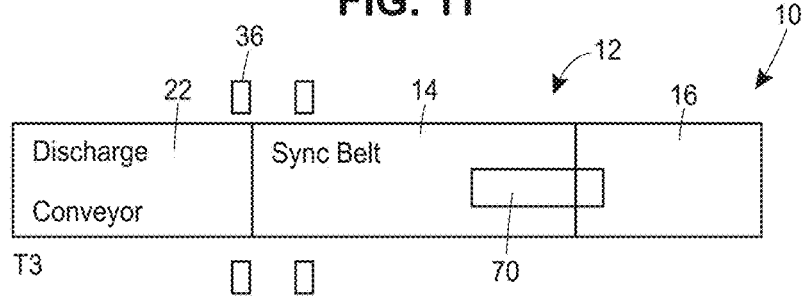
FIG. 12 is yet another schematic view of the conveyor system of FIG. 9 at a time T3.

In FIG. 12, a time T3 is depicted, in which the object 70 is conveyed further along the synchronization unit 12. At this time, the velocity $V_eT_3$ of the first conveyor belt exceeds the velocity $V_D$ of the discharge conveyor belt 22.

Generally, the conveyor system 10 of the present disclosure may be operated in the following exemplary manner. Specifically, the joint shuttle 24 is disposed between the synchronization belt 14 and the metering belt 16 of the synchronization unit 12. The joint shuttle 24, via the joint shuttle servomotor 30, matches a trailing edge of the exiting object "n" disposed on the synchronization unit 12 with a leading edge of the approaching object "n+1." While the objects 70 (FIGS. 10-12) are being conveyed, a distance between the inlet end 18 and the outlet end 20 of the synchronization unit 12 is maintained at a fixed value, while the lengths of each of the synchronization and metering belts 14, 16 vary. This process helps prevent relative movement between the synchronization and metering belts 14, 16 and the objects 70, for example, being conveyed into the inlet end 18 and discharged out of the outlet end 20.

More specifically, to match the trailing edge of the exiting object "n" with the leading edge of the approaching object "n+1", the joint shuttle 24 is moved via the joint shuttle servomotor 30 in downstream direction or toward the outlet end 20 to follow the trailing edge of the exiting object "n." This occurs until the leading edge of the approaching object "n+1" is discharged onto the synchronization unit 12 and a gap between the exiting object "n" and the approaching object "n+1" is zero.

When the gap between the exiting object "n" and the approaching object "n+1" is zero, the joint shuttle 24 is moved again via the joint shuttle servomotor 30 in an upstream direction or a direction toward the inlet end 18 and under the discharged approaching object "n+1." This occurs while the synchronization conveyor belt 14 and the metering conveyor belt 16 are running at the same velocity, ultimately preventing any relative movement between a surface of either of the synchronization or metering conveyor belts 14, 16 and any object 70 of the plurality of objects being conveyed.

Preventing relative movement between the conveyor belts 14, 16 and the objects 70 further includes controlling the synchronization conveyor belt 14 via the synchronization belt 32 to equal a velocity of the exiting object "n" and then to equal a velocity of the metering conveyor belt 16. During the process, the velocity $V_m$ of the metering conveyor belt 16 is controlled via the metering belt servomotor 34, such that the velocity $V_m$ of the metering belt conveyor 16 is a constant value for each cycle. Said another way, $V_m$=LL/GCT, where LL=a length of an object 70, and GCT is a gripper cycle time of a gripper of a sheeter of which the discharge conveyor belt 22 may be a part.

In another example, the conveyor system 10 is controlled in the following manner. The synchronization conveyor belt 14 is geared onto the discharge conveyor belt 22 as an approaching object "n+1" is leaving the sheeter, for example. The metering conveyor belt 16 is operated at a constant velocity equal to a velocity of the sheeter also as the approaching object "n+1" is leaving the sheeter. In addition, the joint shuttle 24 is geared onto a previous or exiting object "n" as the approaching object "n+1" is leaving the sheeter, such that the joint shuttle 24 follows the trailing edge of the exiting object "n."

In addition, the synchronization conveyor belt 14 is then geared off of the discharge conveyor belt 22 and onto the metering conveyor belt 16 when the approaching object "n+1" is completely discharged from the discharge conveyor belt 22 and the leading edge of the approaching object "n+1" matches the trailing edge of the exiting object "n." The synchronization conveyor belt 14 and the metering conveyor belt 16 run at the same velocity during this time, avoiding relative movement between the belts 14, 16 and the object 70. The joint shuttle 24 is then geared off of the metering conveyor belt 16 and returned to an initial position when the approaching object "n+1" is completely discharged and the leading end of the approaching object "n+1" matches the trailing edge of the exiting object "n." The joint shuttle 24 is then actuated to follow the trailing edge of the approaching object "n+1", thereby completing a cycle of the synchronization conveyor belt 14.

Gearing the synchronization conveyor belt 14 onto the discharge conveyor belt 22 as the approaching object "n+1" is leaving the sheeter further comprises gearing the synchronization conveyor belt 14 via a synchronization belt servomotor 32. The discharge belt servomotor and the synchronization servomotor 32 are in a 1:1 matched velocity ratio.

In addition, the velocity $V_D$ of the discharge conveyor belt is controlled via the discharge belt servomotor such that the discharge conveyor belt 22 has an initial velocity $V_{D1}$ of zero, a final velocity $V_{Df}$ equal to the velocity $V_m$ of the metering conveyor belt 16, and a maximum velocity $V_{Dmax}$ that is a function of a distance the object 70 is to travel, the final velocity $V_{Df}$ and a set time to complete discharge.

The velocity of the synchronization conveyor belt 14 is controlled via the synchronization belt servomotor 32 such that the synchronization conveyor belt 14 follows a profile of the discharge conveyor belt 22 from a time the leading edge of the approaching log "n+1" is a set distance from the synchronization conveyor belt 14 until the "kiss" position is achieved. After that time, the synchronization belt servomotor 32 controls the synchronization conveyor belt 14 to follow a profile of the metering conveyor belt 16.

The velocity of metering conveyor belt 16 is controlled via the metering conveyor belt servomotor 34 such that the velocity $V_m$ of the metering conveyor belt is a constant value for each cycle, wherein $V_m$=LL/GCT, LL is a length of an object and GCT is a gripper cycle time, as noted.

Gearing the joint shuttle 24 off of the metering conveyor belt 16 and returning the joint shuttle 24 to the initial position when the approaching object "n+1" is completely discharged and the leading end of the approaching object "n+1" matches the trailing end of the exiting object "n" further comprises actuating a velocity command via a joint shuttle servomotor 30 to move the joint shuttle 24 back to its initial position.

The velocity of the joint shuttle $V_{JS}$ is controlled via the joint shuttle servomotor 30 such that the velocity of the joint shuttle $V_{JS}$ equals the velocity of the metering conveyor belt 16 $V_m$ until the "kiss" position, after which time the joint shuttle servomotor 30 actuates the joint shuttle 24 to return to an initial position.

Figure 13:
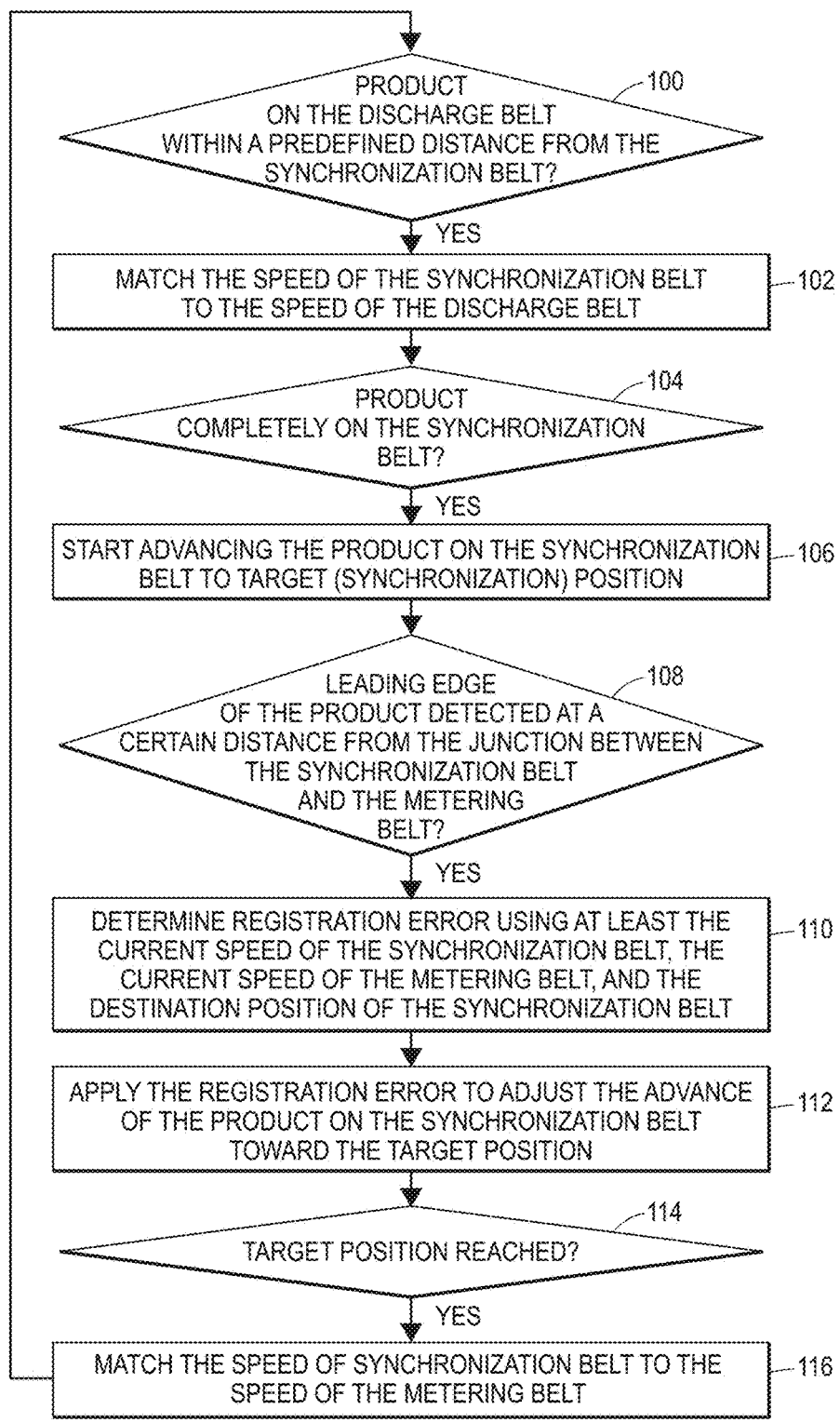
FIG. 13 is a flow chart depicting a manner of operation of the conveyor system of the present disclosure.

Referring now to FIG. 13, a flow chart depicting a manner of operation of the conveyor system 10 is illustrated. More specifically, at block 100 the conveyor system 10 determines whether an object or product on the discharge conveyor belt 22 is within a predefined distance from the synchronization conveyor belt 14. If yes, the velocity of the synchronization conveyor belt 14 is matched to the velocity of the discharge conveyor belt 22 via the synchronization belt servomotor 32, as depicted at block 102. Thus, at this time, the velocities of the discharge conveyor belt 22 and the synchronization conveyor belt 14 are equal.

At block 104, the conveyor system 10 next determines whether the object is completely on the synchronization conveyor belt 14. If yes, the object is advanced on the synchronization conveyor belt 14 to a target or synchronization position, as depicted at block 106.

At block 108, the conveyor system 10 next determines whether the leading edge of the object is detected at a certain distance from the joint 26 or junction between the synchronization conveyor belt 14 and the metering conveyor belt 16. If yes, the conveyor system 10 then determines the registration error using at least the current velocity of the synchronization conveyor belt 14, the current velocity of the metering conveyor belt 16, and the destination position of the synchronization conveyor belt 14, as depicted at block 110. At block 112, the conveyor system 10 then applies the registration error calculated to adjust the advance of the object on the synchronization conveyor belt 14.

The conveyor system 10 next determines whether a target position is reached, at block 114. If yes, the synchronization belt servomotor 32 matches the velocity of the synchronization conveyor belt 14 to the velocity of the metering conveyor belt 16, as depicted at block 116.

Figure 14:
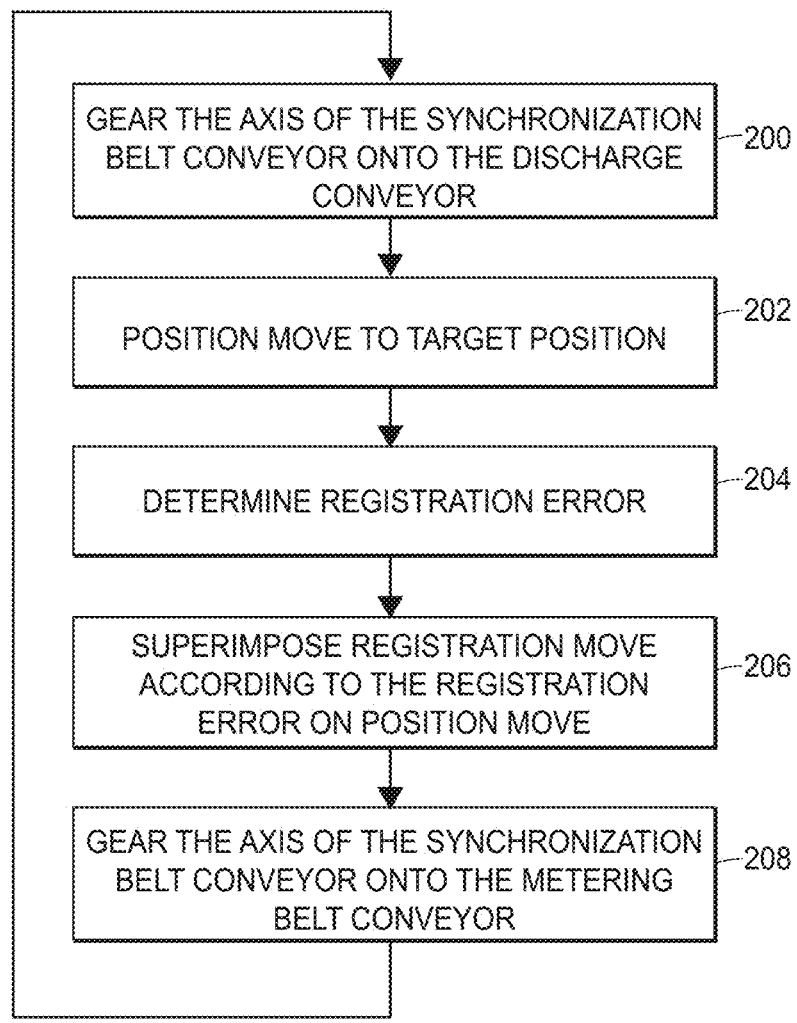
FIG. 14 is another flow chart depicting a manner of operation of a synchronization conveyor belt of the conveyor system.

Referring now to FIG. 14, a flow chart depicting a manner of operation of the synchronization conveyor belt 14 of the conveyor system 10 is illustrated. More specifically, at block 200, an axis of the synchronization conveyor belt 14 is geared onto the discharge conveyor belt 22. At block 202, there is a position move to a target position, and at block 204, the registration error is calculated. Once calculated, as previously explained, a registration move according to the registration error is superimposed on the position move at block 206. As depicted at block 208, the axis of the synchronization conveyor belt 14 is geared onto the metering belt conveyor 16.

Figure 15:
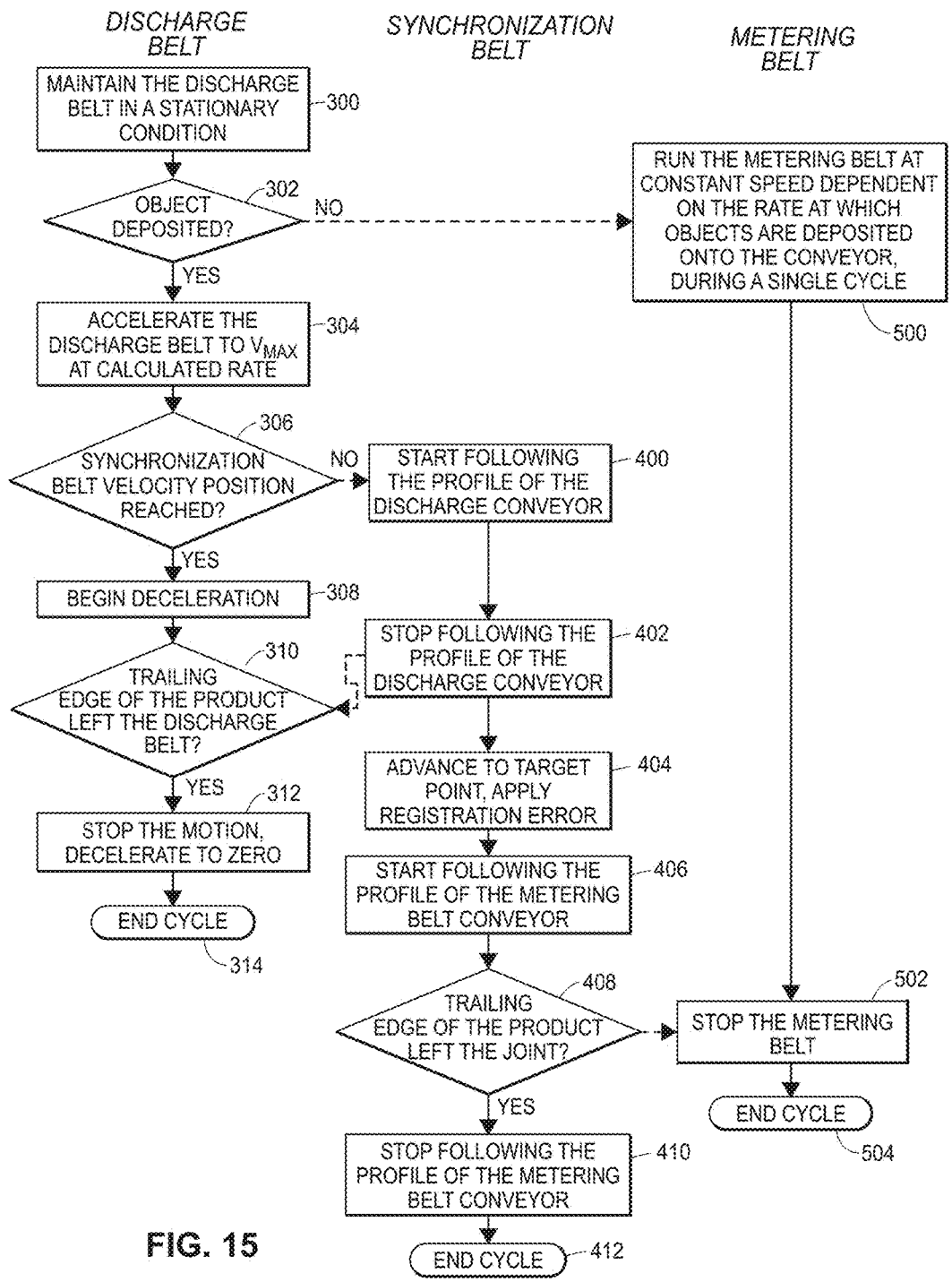
FIG. 15 is a flow chart depicting a manner of operation of each of a discharge conveyor belt, a synchronization belt and a metering belt of a conveyor system of the present disclosure.
Figure 2:
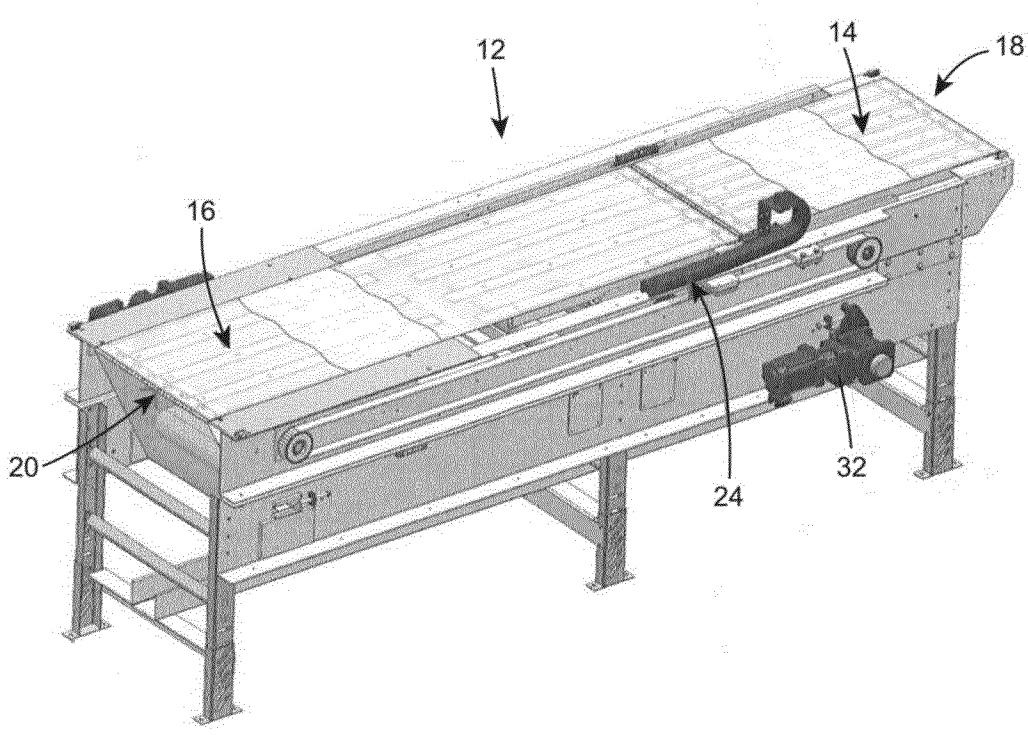

Referring now to FIG. 15, a flow chart depicting interaction between each of the discharge conveyor belt 22 (far left), the synchronization conveyor belt 14 (center), and the metering conveyor belt 16 (far right) during a cycle of the conveyor system 10 is provided. More specifically, at block 300, a discharge belt servomotor maintains the discharge conveyor belt 22 in a stationary condition. It is then determined whether the object has been deposited onto the discharge conveyor belt 22 at block 302. If yes, the discharge conveyor belt 22 is accelerated to a maximum velocity $V_{max}$ at a calculated rate at block 304. At this time and throughout a single cycle of the conveyor system 10, the metering belt conveyor 16 is running at a constant velocity, as depicted by block 500.

At block 306, it is determined whether the synchronization conveyor belt velocity position has been reached. If yes, deceleration of the discharge conveyor belt 22 begins at block 308 and the synchronization conveyor belt 14 follows the profile of the discharge conveyor belt 22 at block 400. It is then determined whether the trailing edge of the object left the discharge conveyor belt 22 at block 310. If yes, the discharge conveyor belt 22 decelerates to zero at block 312 to end the cycle (block 314) of the discharge conveyor belt 22 and the synchronization conveyor belt 14 stops following the profile of the discharge conveyor belt 22 at block 402. The synchronization conveyor belt 14 is then advanced to a target point and registration error is applied in block 404.

At block 406, the synchronization conveyor belt 14 then starts following the profile of the metering conveyor belt 16. At block 408, it is then determined whether the trailing edge of the object left the joint. If yes, the synchronization conveyor belt 14 stops following the profile of the metering belt conveyor 16 in block 410 and the cycle of the synchronization conveyor belt 14 ends (block 412). In addition, the metering conveyor belt 16 is also stopped at block 502, ending the cycle of the metering belt (block 504).

While the preceding text sets forth a detailed description of numerous different examples of the invention, it should be understood that the legal scope of the invention is defined by the words of the claims set forth at the end of this disclosure. The detailed description is to be construed as exemplary only and does not describe every possible embodiment or example of the invention, as describing every possible embodiment would be impractical, if not impossible. Numerous alternative embodiments or examples could be implemented, using either current technology or technology developed after the filing date of this patent, which would still fall within the scope of the claims of the patent. More generally, although certain example systems and methods have been described herein, the scope of coverage of this patent is not limited thereto. On the contrary, this patent covers all methods, apparatus and articles of manufacture fairly falling within the scope of the appended claims either literally or under the doctrine of equivalents.

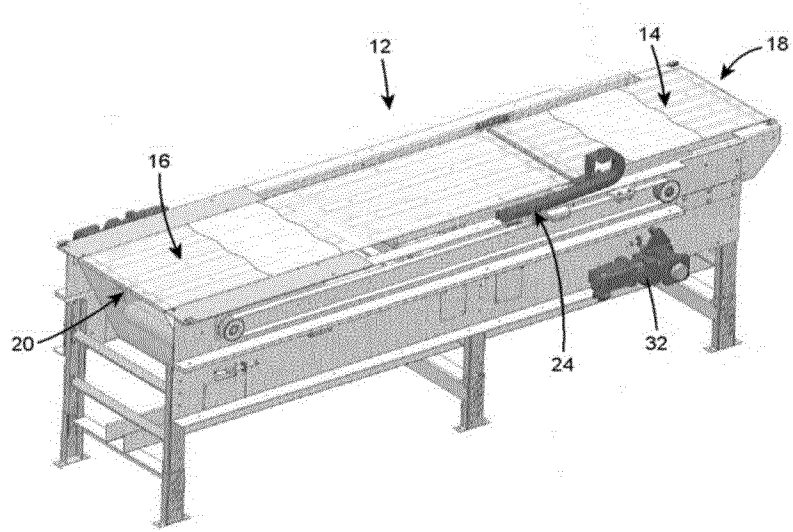

What is claimed is:

1. A method of controlling a conveyor system comprising:
   gearing a synchronization conveyor belt onto a discharge conveyor belt as an approaching object "n+1" is leaving a sheeter;

operating a metering conveyor belt at a constant velocity as the approaching object "n+1" is leaving the sheeter;

gearing a joint shuttle onto a previous or exiting object "n" as the approaching object "n+1" is leaving the sheeter, such that the joint shuttle follows a trailing edge of the exiting object "n";

gearing the synchronization conveyor belt off of the discharge conveyor belt and onto the metering conveyor belt when the approaching object "n+1" is completely discharged from the discharge conveyor belt and a leading edge of the approaching object "n+1" matches the trailing edge of the exiting object "n", such that the synchronization conveyor belt and the metering conveyor belt run at the same velocity, avoiding relative movement between the belts and the object;

gearing the joint shuttle off of the metering conveyor belt and returning the joint shuttle to an initial position when the approaching object "n+1" is completely discharged and the leading end of the approaching object "n+1" matches a trailing end of the exiting object "n"; and actuating the joint shuttle to follow a trailing edge of the approaching object "n+1", thereby completing a cycle of the synchronization conveyor belt.

2. The method of claim 1, wherein gearing the synchronization conveyor belt onto the discharge conveyor belt as the approaching object "n+1" is leaving the sheeter further comprises gearing the synchronization conveyor belt via a synchronization belt servomotor, wherein a discharge belt servomotor for controlling the discharge conveyor belt and the synchronization servomotor are in a 1:1 matched velocity ratio.

3. The method of claim 1, wherein the velocity $V_D$ of the discharge conveyor belt is controlled via a discharge belt servomotor such that the discharge conveyor belt has an initial velocity $V_{D1}$ of zero, a final velocity $V_{Df}$ equal to the velocity $V_m$ of the metering conveyor belt, and a maximum velocity $V_{Dmax}$ that is a function of a distance the object is to travel, the final velocity $V_{Df}$ and a set time to complete discharge.

4. The method of claim 1, wherein the velocity of the synchronization conveyor belt is controlled via the synchronization belt servomotor such that the synchronization conveyor belt follows a profile of the discharge conveyor belt from a time the leading edge of the approaching log "n+1" is a set distance from the synchronization conveyor belt until a kiss position is achieved, after which time the synchronization belt servomotor controls the synchronization conveyor belt to follow a profile of the metering conveyor belt.

5. The method of claim 1, wherein the velocity of metering conveyor belt is controlled via the metering belt servomotor such that the velocity of the metering conveyor belt $V_m$ is a constant value for each cycle, wherein $V_m$=LL/GCT, LL is a length of an object and GCT is a gripper cycle time.

6. The method of claim 1, wherein gearing the joint shuttle off of the metering conveyor belt and returning the joint shuttle to an initial position when the approaching object "n+1" is completely discharged and the leading end of the approaching object "n+1" matches a trailing end of the exiting object "n" further comprises actuating a velocity command via a joint shuttle servomotor to move the joint shuttle back to its initial position.

7. The method of claim 6, wherein the velocity of the joint shuttle $V_{JS}$ is controlled via the joint shuttle servomotor such that the velocity of the joint shuttle $V_{JS}$ equals the velocity of the metering conveyor belt $V_m$ until a kiss position, after which time the joint shuttle servomotor actuates the joint shuttle to return to an initial position.

\* \* \* \* \*

UNITED STATES PATENT AND TRADEMARK OFFICE
CERTIFICATE OF CORRECTION

PATENT NO. : 10,000,341 B2
APPLICATION NO. : 15/095931
DATED : June 19, 2018
INVENTOR(S) : Thomas Ullmer et al.

It is certified that error appears in the above-identified patent and that said Letters Patent is hereby corrected as shown below:

On the Title Page

At item (73), Line 1, "Sheboygan, WA" should be -- Sheboygan, WI --.

In Column 1, under "Notice", Line 3, "0 days. days." should be -- 0 days. --.

Delete the title page and substitute therefore with the attached title page consisting of the corrected illustrative figure.

In the Drawings

Please replace FIG. 2 with FIG. 2 as shown on the attached page.

Signed and Sealed this
Eleventh Day of June, 2019

Andrei Iancu
*Director of the United States Patent and Trademark Office*

CERTIFICATE OF CORRECTION (continued) Page 2 of 3

(12) United States Patent
Ullmer et al.

(10) Patent No.: US 10,000,341 B2
(45) Date of Patent: Jun. 19, 2018

(54) CONVEYOR SYSTEM AND METHOD

(71) Applicant: PEMCO INC., Sheboygan, WI (US)

(72) Inventors: Thomas Ullmer, Sheboygan, WI (US); Terry Lee Eernissee, Cedar Grove, WI (US); Eric Edward Walker, Campbellsport, WI (US)

(73) Assignee: PEMCO INC., Sheboygan, WA (US)

(*) Notice: Subject to any disclaimer, the term of this patent is extended or adjusted under 35 U.S.C. 154(b) by 0 days. days.

(21) Appl. No.: 15/095,931

(22) Filed: Apr. 11, 2016

(65) Prior Publication Data
US 2016/0221759 A1 Aug. 4, 2016

Related U.S. Application Data

(62) Division of application No. 14/255,679, filed on Apr. 17, 2014, now Pat. No. 9,346,627.

(60) Provisional application No. 61/814,676, filed on Apr. 22, 2013.

(51) Int. Cl.
B65G 21/14 (2006.01)
B65G 43/08 (2006.01)
B65G 37/00 (2006.01)
B65G 43/10 (2006.01)
B65G 47/52 (2006.01)
B65G 15/24 (2006.01)
B65G 47/31 (2006.01)

(52) U.S. Cl.
CPC ............. B65G 21/14 (2013.01); B65G 15/24 (2013.01); B65G 37/00 (2013.01); B65G 43/08 (2013.01); B65G 43/10 (2013.01); B65G 47/31 (2013.01); B65G 47/52 (2013.01); B65G 2811/0673 (2013.01)

(58) Field of Classification Search
None
See application file for complete search history.

(56) References Cited

U.S. PATENT DOCUMENTS 3,075,630 A 1/1963 Fisk
4,790,224 A 12/1988 Krutilla et al.
(Continued)

Primary Examiner — Kavel Singh
(74) Attorney, Agent, or Firm — Marshall, Gerstein & Borun LLP

(57) ABSTRACT

A conveyor system comprising a synchronization unit having a first conveyor belt, a second conveyor belt disposed adjacent to the first conveyor belt, an inlet end and an outlet end. The system further comprises a joint shuttle disposed between the first conveyor belt and the second conveyor belt, each of the first and second conveyor belts having a variable length while the distance between the inlet end and the outlet end is fixed. A discharge conveyor belt is disposed upstream the inlet end and is operating at a first velocity ($V_D$). At a time T1, the velocity of the first conveyor belt ($V_1T_1$) is equal to the velocity of the discharge conveyor belt ($V_D$) and, at a time T2, the velocity of the first conveyor belt ($V_1T_2$) is equal to the velocity of the second conveyor belt ($V_m$), without relative movement between the conveyor belts and objects conveyed thereon.

7 Claims, 12 Drawing Sheets